United States Patent
Zhou et al.

(10) Patent No.: US 8,062,624 B2
(45) Date of Patent: Nov. 22, 2011

(54) HYDROGEN STORAGE APPARATUS USING POROUS CARBON NANOSPHERES

(75) Inventors: Bing Zhou, Cranbury, NJ (US); Cheng Zhang, Pennington, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 156 days.

(21) Appl. No.: 12/604,181

(22) Filed: Oct. 22, 2009

(65) Prior Publication Data

US 2010/0038263 A1 Feb. 18, 2010

Related U.S. Application Data

(62) Division of application No. 11/850,581, filed on Sep. 5, 2007, now Pat. No. 7,670,588.

(51) Int. Cl.
*C01B 3/00* (2006.01)
(52) U.S. Cl. ......... 423/658.2; 96/108; 428/403; 75/255; 420/900; 977/700; 977/840
(58) Field of Classification Search ........ 95/90; 75/255; 423/658.2; 428/403; 977/700, 840
See application file for complete search history.

(56) References Cited

U.S. PATENT DOCUMENTS

| | | | |
|---|---|---|---|
| 6,746,496 B1 | 6/2004 | Kravitz et al. | |
| 7,135,057 B2 | 11/2006 | Kornilovich | |
| 7,175,826 B2 | 2/2007 | Lemmon et al. | |
| 2004/0109814 A1 | 6/2004 | Simard et al. | |
| 2004/0209144 A1 | 10/2004 | Kornilovich | |
| 2005/0000970 A1 | 1/2005 | Kimbara et al. | |
| 2005/0180916 A1 | 8/2005 | Autrey et al. | |
| 2005/0217427 A1 | 10/2005 | Suthersan et al. | |
| 2006/0240256 A1 | 10/2006 | Woo et al. | |
| 2007/0082255 A1 | 4/2007 | Sun et al. | |
| 2007/0265162 A1 | 11/2007 | Zhang et al. | |

FOREIGN PATENT DOCUMENTS

WO WO 2007044614 4/2007

OTHER PUBLICATIONS

Dillon, A.C. and Heben, M.J., Hydrogen Storage using carbon adsorbents: past present and future, Applied Physics A Materials Science & Processing, Feb. 9, 2001, pp. 133-142, Springer-Verlag.
Simonyan V.V. and Johnson, J.K., Hydrogen storage in carbon nanotubes and graphitic nanofibers, Journal of Alloys and Compounds, 2002, pp. 659-665, 330-332, Elsevier Science B.V.
Satyapal, S., and Heben, M., New Hydrogen Storage "Grand Challenge" Projects, DOE Hydrogen Program: FY 2004 Progress Report, 2004, pp. 179-182, 245-252, 253-257 and 261-265.
Office Action dated May 5, 2009 cited in U.S. Appl. No. 11/850,581.
Notice of Allowance dated Oct. 22, 2009 cited in U.S. Appl. No. 11/850,581.

*Primary Examiner* — Robert J Hill, Jr.
*Assistant Examiner* — Christopher P Jones
(74) *Attorney, Agent, or Firm* — Workman Nydegger

(57) ABSTRACT

Hydrogen is stored by adsorbing the hydrogen to a carbon nanomaterial that includes carbon nanospheres. The carbon nanospheres are multi-walled, hollow carbon nanostructures with a maximum diameter in a range from about 10 nm to about 200 nm. The nanospheres have an irregular outer surface with graphitic defects and an aspect ratio of less than 3:1. The carbon nanospheres can store hydrogen in quantities of at least 1.0% by weight.

24 Claims, 6 Drawing Sheets

HYDROGEN STORAGE APPARATUS USING POROUS CARBON NANOSPHERES

CROSS-REFERENCE TO RELATED APPLICATION

This application is a division of U.S. patent application Ser. No. 11/850,581, filed Sep. 5, 2007, now U.S. Pat. No. 7,670,588 B2, the disclosure of which is incorporated herein in its entirety.

BACKGROUND OF THE INVENTION

1. The Field of the Invention

The present invention relates generally to the storage of molecular hydrogen. More particularly, the present invention relates to the storage of hydrogen using carbon nanospheres.

2. The Related Technology

The limited supplies of fossil fuels and the increasing number of densely populated metropolitan cities with poor local air quality have spurred interest in developing new energy sources. Hydrogen has emerged as a promising candidate for replacing various aspects of the world's current energy production system. Hydrogen is attractive as a fuel source because it can be produced from renewable sources and burns pollution-free or can be used in pollution-free fuel cells, as the combustion or reaction product is water.

The single greatest impediment to the use of hydrogen as an energy source is the lack of a convenient, cost-effective storage system for vehicles. Traditional methods for storing hydrogen employ large, heavy high-pressure tanks that are not practical or cost effective for widespread use in the transportation industry.

Extensive research is being performed to develop a hydrogen storage system suitable for the transportation industry and other industries that require a light-weight and safe storage mechanism. Possible current approaches include (i) physical storage via compression or liquefaction, (ii) chemical storage in irreversible hydrogen carriers (e.g., methanol or ammonia), (iii) reversible metal and chemical hydrides, and (iv) gas-on-solid adsorption.

Carbon based adsorbents have been studied for their potential to store hydrogen. Initial efforts to store hydrogen in carbon involved "activated" carbons. However, activated carbons are ineffective in storing hydrogen because only a small fraction of the pores in the typically wide pore-size distribution are small enough to interact strongly with hydrogen molecules at room temperature and moderate pressures. Recently, single-walled and multi-walled nanotubes have been studied for their potential to store hydrogen. Recent work relating to carbon nanotubes has shown that various differences in carbon nanotubes can have significant impact on the ability of carbon nanotubes to store hydrogen. However, despite extensive efforts to optimize carbon nanotubes for hydrogen storage, storage capacity in carbon nanotubes is not currently feasible for most applications.

BRIEF SUMMARY OF THE INVENTION

The present invention relates to novel methods for storing hydrogen on carbon using a carbon nanomaterial that includes carbon nanospheres. The physical and chemical properties of the carbon nanospheres provide advantages for storing hydrogen as compared to carbon nanotubes and other carbon based materials that have been used to store hydrogen.

The carbon nanospheres used in the present invention are typically multi-walled, hollow carbon nanostructures with a maximum diameter in a range from about 10 nm to about 200 nm. Typically the nanospheres have an aspect ratio of less than about 3:1 (i.e., width to height is less than 3:1), preferably less than about 2:1, more preferably less than about 1.75:1, and most preferably less than about 1.5:1. In one embodiment, the carbon nanospheres have an irregular surface. The irregular surface has graphitic defects that cause the nanospheres to have a shape that is not perfectly spherical. The graphitic defects are believed to contribute to the ability to store hydrogen and/or to achieve a desired surface functionalization, which can also contribute to hydrogen storage. The carbon nanospheres are highly graphitic, which gives the carbon nanomaterial excellent electrical and thermal conductivity. The highly graphitic nature is also very beneficial for hydrogen storage.

The size and shape of the carbon nanospheres is particularly advantageous for storing hydrogen. The carbon nanospheres of the invention have a large surface area available for adsorbing hydrogen. In one embodiment, the surface area is in a range from about 80 $m^2/g$ to about 400 $m^2/g$, more preferably about 120 $m^2/g$ to about 300 $m^2/g$, and most preferably about 150 $m^2/g$ to about 250 $m^2/g$. The closed structure is also partially responsible for the high surface area. The hollowness of the nanospheres can be advantageous because the hollow portion reduces the weight of the carbon nanomaterial while having a comparatively less deleterious effect on hydrogen storage compared to the open hollow center of carbon nanotubes.

The multi-walled nature of the graphitic structure provides multiple layers for storing hydrogen and provides narrow spacing between the individual graphite sheets or layers for storing hydrogen. Because the nanospheres are a closed structure, the carbon nanospheres do not have macro pores for hydrogen to flow through, which can improve hydrogen storage. The spheroidal shape and multi-walled nature of the carbon nanospheres also provides strength that makes the carbon nanospheres less likely to be crushed or broken into undesired shapes or non-shaped graphite. Maintaining the shape of the carbon nanospheres can be important for maintaining performance characteristics over time (e.g., adsorption and reversibility of adsorption). The multi-walled nature of the nanospheres also allows the surface to be functionalized while maintaining the beneficial thermal and electrical conductivity via the interior graphite layers.

The shape of the carbon nanospheres can also be advantageous for reducing the bulk volume compared to other graphitic structures such as carbon nanotubes. Carbon nanotubes typically have a much lower packing density than carbon nanospheres owing to the high aspect ratio and shape of nanotubes. Carbon nanospheres, which pack similar to a particulate, pack significantly more tightly than carbon nanotubes, which pack similar to a disordered fiber. The increased packing density of carbon nanospheres reduces the overall bulk volume needed to store a given amount of carbon nanospheres within a vessel, thereby reducing the overall size and weight of the vessel used to house the carbon nanospheres for a given amount of hydrogen storage.

In one embodiment, the method for manufacturing the carbon nanomaterial can be carried out in the following steps. A precursor mixture is formed that includes a carbon precursor and a plurality of templating nanoparticles. The templating nanoparticles include a catalytic metal (e.g., iron). The precursor mixture is carbonized (i.e., heated) to form an intermediate carbon material that includes a plurality of carbon nanostructures, amorphous carbon, and optionally catalytic metal. The intermediate carbon material is purified by removing at least a portion of the amorphous carbon and optionally a portion of remaining catalytic metal to yield a carbon nanomaterial having carbon nanospheres.

The final carbon nanomaterial can be nearly pure nanospheres or can include other graphitic materials. Higher percentages of carbon nanospheres are typically preferred such that the carbon nanomaterial can benefit from the unique properties of the carbon nanospheres. In one embodiment, the nanospheres are at least about 10 wt % of the carbon nanomaterial, preferably at least about 50 wt %, more preferably at least about 75 wt %, even more preferably at least about 90 wt %, and most preferably at least about 98 wt % of the carbon nanomaterial. The portion of the carbon nanomaterial that is not carbon nanospheres is preferably a graphitic material, such as graphite sheets or other graphitic nanostructures. The carbon nanomaterials can include non-graphitic amorphous carbon. However, it is typically advantageous to minimize the percentage of non-graphitic amorphous carbon (e.g., by removing it during purification and/or by converting non-graphitic amorphous carbon to graphite during additional heat treatment steps). Graphitic carbon is better able to store hydrogen than amorphous carbon.

In one embodiment, the nanostructures are manufactured by controlling the formation of the templating nanoparticles using an organic dispersing agent (e.g., glycolic acid). Nanospheres manufactured from metal nanoparticles formed using an organic dispersing agent tend to be more uniformly sized, which facilitates the formation of nanospheres with a desired size and porosity for hydrogen storage. However, even without using an organic dispersing agent in the manufacturing process, the carbon nanospheres of the invention tend to have a more uniform porosity and graphitization compared to some carbon nanostructures such as many types carbon nanotubes.

To use the carbon nanospheres for hydrogen storage, the carbon nanospheres can be placed in any vessel capable of housing the carbon nanomaterial and exposing the carbon nanomaterial to hydrogen such that it can be absorbed. In one embodiment, the vessel is pressurized. Examples of suitable ranges of pressure that can be used include from about 100 atm to about 0.1 atm, more preferably from about 50 atm to about 1 atm.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

I. Introduction and Definitions

Figure 1:
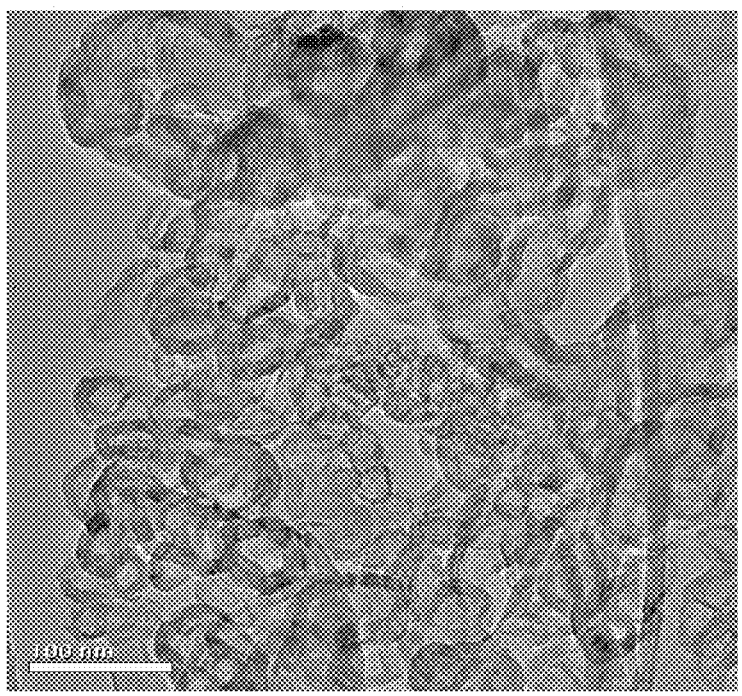
FIG. 1 is a high resolution TEM image of a carbon nanomaterial for storing hydrogen according to one embodiment of the invention.

The present invention is directed to methods for storing hydrogen using carbon nanospheres and hydrogen storage devices containing carbon nanospheres. In one embodiment, the carbon nanospheres are formed from a carbon precursor and catalytic templating nanoparticles. Methods for manufacturing carbon nanospheres generally include (1) forming a precursor mixture that includes a carbon precursor and a plurality of catalytic templating particles, (2) carbonizing the precursor mixture to form an intermediate carbon material including carbon nanospheres, amorphous carbon, and catalytic metal, and (3) purifying the intermediate carbon material by removing at least a portion of the amorphous carbon and optionally at least a portion of the catalytic metal to yield carbon nanostructures containing a substantial quantity of carbon nanospheres.

The carbon nanostructures manufactured using the foregoing steps have one or more carbon layers forming a wall that generally appears to define a nanosphere. In one embodiment, the carbon nanostructure can be characterized as hollow but irregularly shaped multi-walled, sphere-like (or spheroidal) nanostructures when analyzed in view of SEM images in combination with TEM images of the same material. In one embodiment, the carbon nanostructures form clusters of grape-like structures, as seen in SEM images, but which are known to be comprised of hollow multi-walled nanostructures, as shown by TEM images of the same material. For purposes of this invention, the term "nanosphere" includes graphitic, hollow particles or balls that have a regular or an irregular outer shape.

II. Components Used to Manufacture Carbon Nanostructures

The following components can be used to carry out the above mentioned steps for manufacturing carbon nanostructures according to the present invention.

A. Carbon Precursor

Any type of carbon material can be used as the carbon precursor of the present invention so long as it can disperse the templating particles and carbonize around the templating particles upon heat treating. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The carbon precursor can be a single type of molecule (e.g., a compound that can polymerize with itself), or the carbon precursor can be a combination of two or more different compounds that co-polymerize together. For example, in an exemplary embodiment, the carbon precursor can be a resorcinol-formaldehyde gel. In this two compound embodiment, the formaldehyde acts as a cross-linking agent between resorcinol molecules by polymerizing with the hydroxyl groups of the resorcinol molecules.

Other examples of suitable carbon precursors include resorcinol, phenol resin, melamine-formaldehyde gel, poly (furfuryl alcohol), poly(acrylonitrile), sucrose, petroleum pitch, and the like. Other polymerizable benzenes, quinones, and similar compounds can also be used as carbon precursors and are known to those skilled in the art.

In an exemplary embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

B. Catalytic Templating Nanoparticles

The catalytic templating nanoparticles are used as a template for making the nanostructures. When mixed with the carbon precursor, the templating nanoparticles provide a nucleation site where carbonization and/or polymerization can begin or be enhanced. Because the templating nanoparticles are made from catalytic atoms, the templating particles can advantageously serve as both a nucleating site and as a catalyst for carbonization and/or polymerization.

The catalytic templating particles can be formed in more than one way. As described below, in one embodiment, the templating particles are formed from metal salts that agglomerate to form particles. Optionally, the catalyst atoms can be complexed with a dispersing agent to control formation of the particles. Templating nanoparticles formed using a dispersing agent tend to be more uniform in size and shape than templating particles formed without a dispersing agent.

1. Catalyst Atoms

The catalyst atom used to form the templating nanoparticles can be any material that can cause or promote carbonization and/or polymerization of the carbon precursor. In a preferred embodiment, the catalyst is a transition metal catalyst including but not limited to iron, cobalt, or nickel. These transition metal catalysts are particularly useful for catalyzing many of the polymerization and/or carbonization reactions involving the carbon precursors described above.

2. Dispersing Agents

Optionally, a dispersing agent can be complexed with the catalyst atoms to control formation of the templating nanoparticles. The dispersing agent is selected to promote the formation of nanocatalyst particles that have a desired stability, size and/or uniformity. Dispersing agents within the scope of the invention include a variety of small organic molecules, polymers and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In a preferred embodiment, the molar ratio of dispersing agent functional groups to catalyst atoms is preferably in a range of about 0.01:1 to about 100:1, more preferably in a range of about 0.05:1 to about 50:1, and most preferably in a range of about 0.1:1 to 20:1.

The dispersing agents of the present invention allow for the formation of very small and uniform nanoparticles. In general, the nanocatalyst particles formed in the presence of the dispersing agent are less than 1 micron in size. Preferably the nanoparticles are less than about 100 nm, more preferably less than about 50 nm and most preferably less than about 20 nm.

During pyrolysis of the carbon precursor, the dispersing agent can inhibit agglomeration and deactivation of the catalyst particles. This ability to inhibit deactivation can increase the temperature at which the nanocatalysts can perform and/or increase the useful life of the nanocatalyst in the extreme conditions of pyrolysis. Even if including the dispersing agent only preserves catalytic activity for a few additional milliseconds, or even microseconds, the increased duration of the nanocatalyst can be very beneficial at high temperatures, given the dynamics of carbonization.

3. Solvents and Other Additives

A solvent can optionally be used to prepare the catalyst atoms for mixing with the dispersing agent and/or the carbon precursor. The liquid medium in which the catalytic templating nanoparticles are prepared may contain various solvents, including water and organic solvents. Solvents participate in particle formation by providing a liquid medium for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g., less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easy separated from the final iron catalyst solution or suspension using simple techniques such as centrifugation and filtration.

C. Reagents For Purifying Intermediate Carbon Materials

Various reagents can be used to remove amorphous carbon and/or the catalytic metals from the carbon nanostructures, thereby purifying the intermediate material. The purification can be carried out using any reagent or combination of reagents capable of selectively removing amorphous carbon (or optionally catalytic metal) while leaving graphitic material.

Reagents for removing amorphous carbon include oxidizing acids, oxidizing agents, and mixtures of these. An example of a mixture suitable for removing amorphous carbon includes sulfuric acid, $KMnO_4$, $H_2O_2$, 5M or greater $HNO_3$, and aqua regia.

The catalytic metal can be removed using any reagent that can selectively dissolve the particular metal used as catalyst without significantly destroying the carbon nanostructures, which are graphitic. Nitric acid is an example of a reagent suitable for dissolving many base transition metals such as, but not limited to, iron, cobalt, and nickel. Other examples of suitable reagents include hydrogen fluoride, hydrochloric acid, and sodium hydroxide.

The removal of amorphous carbon using an oxidative agent tends to introduce a low quantity of oxygen-containing functional groups to the surface. If desired, these functional groups can be removed by performing a subsequent heat treatment at a temperature above about 250° C., more preferably above about 500° C. The additional heat treatment can remove the oxygen-containing functional groups and/or carbonize remaining amorphous carbon.

Alternatively, the carbon nanospheres can be treated with a severe oxidizing agent to introduce additional functional groups to the surface of the carbon nanospheres. Introducing additional oxygen-containing functional groups can be beneficial to make the material more hydrophilic such that it can be dispersed in hydrophilic materials. Examples of suitable severe oxidizing agents include (i) mixtures of nitric acid and sulfuric acid, (ii) solutions of hydrogen peroxide, and (iii) mixtures of sulfuric acid and hydrogen peroxide. Specific examples of suitable concentrations for severe oxidation include, but are not limited to, a mixture of sulfuric acid and nitric acid (70%) in a 3:1 v/v ratio; a solution of 30% hydrogen peroxide; or a mixture of sulfuric acid (98%) and hydrogen peroxide (30%) in a 4:1 v/v ratio.

III. Manufacturing Carbon Nanostructures

The carbon nanostructures of the present invention can be manufactured using all or a portion of the following steps: (i) forming a precursor mixture that includes a carbon precursor and a plurality of templating nanoparticles, (ii) allowing or causing the carbon precursor to polymerize around the catalytic templating nanoparticles, (iii) carbonizing the precursor mixture to form an intermediate carbon material that includes a plurality of nanostructures (e.g., carbon nanospheres), amorphous carbon, and catalytic metal, (iv) purifying the intermediate carbon material by removing at least a portion of the amorphous carbon and optionally a portion of the catalytic metal. The purification step can also include removing oxygen containing functional groups generated during the removal of amorphous carbon or adding additional oxygen-containing functional groups to impart greater hydrophilicity to the carbon nanospheres.

A. Forming a Precursor Mixture

The precursor mixture is formed by selecting a carbon precursor and dispersing a plurality of catalytic templating nanoparticles in the carbon precursor.

The catalytic templating nanoparticles, which are dispersed in the carbon precursor, can be provided in several different ways. The templating nanoparticles can be formed in the carbon precursor (i.e., in-situ) or formed in a separate reaction mixture and then mixed with the carbon precursor. In some cases, particle formation may partially occur in a separate reaction and then be completed as the templating particles are mixed and/or heated in the carbon precursor (e.g., at the onset of a precursor polymerization step). The templating nanoparticles can also be formed using a dispersing agent that controls one or more aspects of particle formation or the templating nanoparticles can be made from metal salts.

In one embodiment, the templating nanoparticles are formed in the carbon precursor from a metal salt. In this embodiment, the templating nanoparticles are formed by selecting one or more catalyst metal salts that can be mixed with the carbon precursor. The metal salts are mixed with the carbon precursor and then allowed or caused to form nanoparticles in-situ.

In a more preferred embodiment, the templating particles are formed (in-situ or ex-situ) using a dispersing agent to control particle formation. In this embodiment, one or more types of catalyst atoms and one or more types of dispersing agents are selected. Next, the catalyst atoms (e.g., in the form of a ground state metal or metal salt) and dispersing agent (e.g., in the form of a carboxylic acid or its salt) are reacted or combined together to form catalyst complexes. The catalyst complexes are generally formed by first dissolving the catalyst atoms and dispersing agent in an appropriate solvent and then allowing the catalyst atoms to bond with the dispersing agent molecules. The various components may be combined or mixed in any sequence or combination. In addition, a subset of the components can be premixed prior to addition of other components, or all components may be simultaneously combined.

In an embodiment of the invention, the components for the templating nanoparticles are allowed or caused to form nanoparticles by mixing the components for a period of about 1 hour to about 14 days. This mixing is typically conducted at temperatures ranging from about 0° C. to about 200° C. In one embodiment, the temperature does not exceed 100° C. Particle formation can also be induced using a reagent. For example, in some cases formation of particles or intermediate particles can be caused by bubbling hydrogen through the solution of catalyst complexes.

The templating nanoparticles of the present invention are capable of catalyzing polymerization and/or carbonization of the carbon precursor. The concentration of catalytic templating nanoparticles in the carbon precursor is typically selected to maximize the number of carbon nanostructures formed. The amount of catalytic templating particles can vary depending on the type of carbon precursor being used. In an example embodiment the molar ratio of carbon precursor to catalyst atoms is about 0.1:1 to about 100:1, more preferably about 1:1 to about 30:1.

B. Polymerizing the Precursor Mixture

The precursor mixture is typically allowed to cure for sufficient time such that a plurality of intermediate carbon nanostructures are formed around the templating nanoparticles. Because the templating nanoparticles are catalytically active, the templating nanoparticles can preferentially accelerate and/or initiate polymerization of the carbon precursor near the surface of the templating particles.

The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

For hydrothermally polymerizable carbon precursors, polymerization typically occurs at elevated temperatures. In a preferred embodiment, the carbon precursor is heated to a temperature of about 0° C. to about 200° C., and more preferably between about 25° C. to about 120° C.

An example of a suitable condition for polymerization of resorcinol-formaldehyde gel (e.g., with iron particles and a solution pH of 1-14) is a solution temperature between about 0° C. and about 90° C. and a cure time of less than 1 hour to about 72 hours. Those skilled in the art can readily determine the conditions necessary to cure other carbon precursors under the same or different parameters.

In one embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

Forming intermediate carbon nanostructures from the dispersion of templating nanoparticles causes formation of a plurality of intermediate carbon nanostructures having unique shapes and sizes. Ultimately, the properties of the nanostructure can depend at least in part on the shape and size of the intermediate carbon nanostructure. Because of the unique shapes and sizes of the intermediate carbon nanostructures, the final nanostructures can have beneficial properties such as high surface area and high porosity, among others.

C. Carbonizing the Precursor Mixture

The precursor mixture is carbonized by heating to form an intermediate carbon material that includes a plurality of carbon nanostructures, amorphous carbon, and catalyst metal.

The precursor mixture can be carbonized by heating the mixture to a temperature between about 500° C. and about 2500° C. During the heating process, atoms such as oxygen and nitrogen are volatilized or otherwise removed from the intermediate nanostructures (or the carbon around the templating nanoparticles) and the carbon atoms are rearranged or coalesced to form a carbon-based structure.

The carbonizing step typically produces a graphite based nanostructure. The graphite based nanostructure has carbon atoms arranged in structured sheets of $sp^2$ hybridized carbon atoms. The graphitic layers can provide unique and beneficial properties, such as electrical conduction and structural strength and/or rigidity.

D. Purifying the Intermediate Carbon Material

The intermediate carbon material is purified by removing at least a portion of non-graphitic amorphous carbon. This purification step increases the weight percent of carbon nanostructures in the intermediate carbon material.

The amorphous carbon is typically removed by oxidizing the carbon. The oxidizing agents used to remove the amorphous carbon are selective to oxidation of the bonds found in non-graphitic amorphous carbon but are less reactive to the pi bonds of the graphitic carbon nanostructures. The amorphous carbon can be removed by applying the oxidative agents or mixtures in one or more successive purification steps.

Optionally substantially all or a portion of the catalytic metals can be removed. Whether the catalytic metal is removed and the purity to which the catalytic metal is removed will depend on the desired amount of metal in the final product. In one embodiment a portion of the metal is purposely left in the carbon nanomaterial to facilitate hydrogen storage. In one embodiment the remaining metal is in a range from about 12% to about 0.01%, more preferably about 1% to about 0.1%. However, if desired all or a portion of the metal can be removed. Removing metal from the center of the nanospheres can improve the porosity of the carbon nanomaterial.

Typically, the templating nanoparticles are removed using acids or bases such as nitric acid, hydrogen fluoride, or sodium hydroxide. The method of removing the templating nanoparticles or amorphous carbon depends on the type of templating nanoparticle or catalyst atoms in the composite. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles and/or amorphous carbon so long as the removal process does not completely destroy the carbon nanostructures. In some cases it may even be beneficial to at least partially remove some of the carbonaceous material from the intermediate nanostructure during the purification process.

During the purification process, the oxidizing agents and acids have a tendency to introduce hydronium groups and oxygenated groups such as, but not limited to, carboxylates, carbonyls, and/or ether groups to the surface of the carbonaceous materials. The oxidizing agents and conditions used to merely remove amorphous carbon typically introduce less than 9 wt % oxygen to the surface of the carbon nanostructures.

Optionally, the purification process can also include additional heat treatment steps at temperatures and conditions that can convert residual amorphous carbon to graphite and/or remove the oxygen-containing functional groups from the surface of the carbon nanospheres. In this optional step, residual carbon is more easily converted to a graphitic material since a substantial portion of the amorphous carbon has been removed and there is better heat transfer to the portion that remains.

Alternatively, additional oxygen-containing functional groups can be introduced to the surface of the carbon nanospheres by treating the intermediate carbon nanomaterial with a severe oxidizing agent. In one embodiment, the severe oxidative treatment is selected from the group of (i) a mixture of nitric acid and sulfuric acid, (ii) a solution of hydrogen peroxide, or (iii) a mixture of sulfuric acid and hydrogen peroxide. Generally, the duration of the oxidative treatment will depend on the amount of amorphous carbon in the intermediate material (i.e., whether a prior purification step has been performed and if so, how much residual amorphous carbon remains), the strength of the oxidizing agent, and the desired amount of functional groups to be introduced. Typically, the rate of functionalization increases with decreasing residual amorphous carbon and increases with increasing oxidizing potential of the oxidizing agent. In one embodiment, the oxidative treatment is carried out for a period of time in a range from about 2 hours to about 48 hours. To facilitate oxidation, the oxidative treatment can be carried out using sonication.

In one embodiment, the oxidative treatment is carried out so as to introduce at least 12 wt % oxygen to the surface of the carbon nanomaterial, more preferably at least about 15 wt % oxygen, even more preferably at least about 20% oxygen, and most preferably at least about 25% oxygen as measured using X-ray Photoelectron Spectroscopy (XPS).

IV. Hydrogen Storage on Carbon Nanospheres

The methods of the present invention produce a carbon nanomaterial having unique properties that have been found to be useful for storing hydrogen. The carbon nanospheres are multi-walled, hollow (with respect to carbon) and typically have a maximum diameter in a range from about 10 nm to about 200 nm.

Figure 2A:
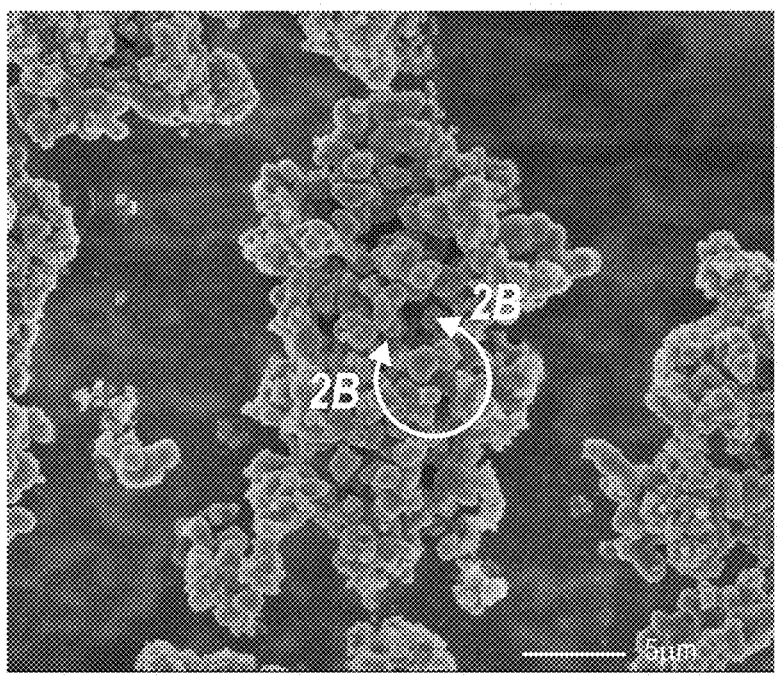
FIG. 2A is a high resolution SEM image of an intermediate carbon material of the present invention, which includes a plurality of nanosphere clusters.
Figure 2B:
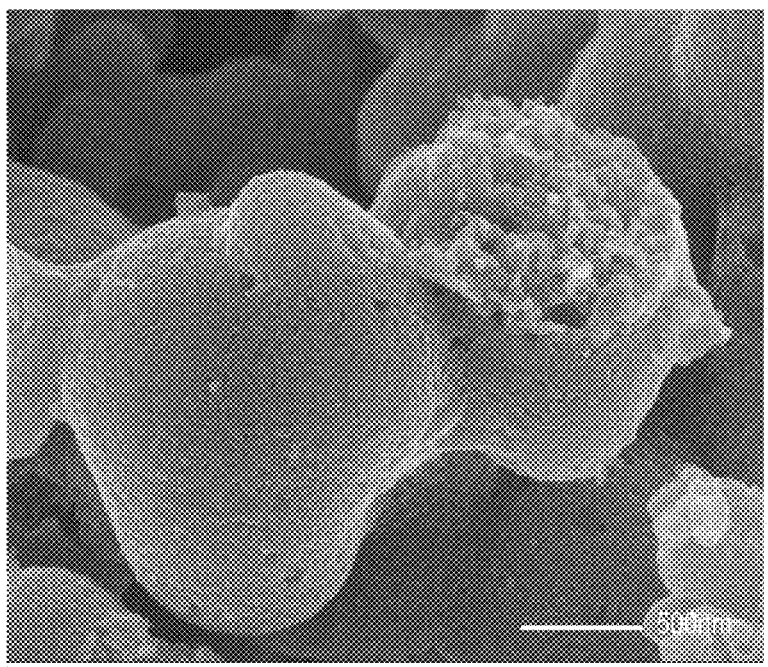
FIG. 2B is a high resolution SEM image showing a closer image of individual clusters of carbon nanostructures and showing one cluster that has been broken open to reveal the plurality of carbon nanostructures that make up the cluster.
Figure 2C:
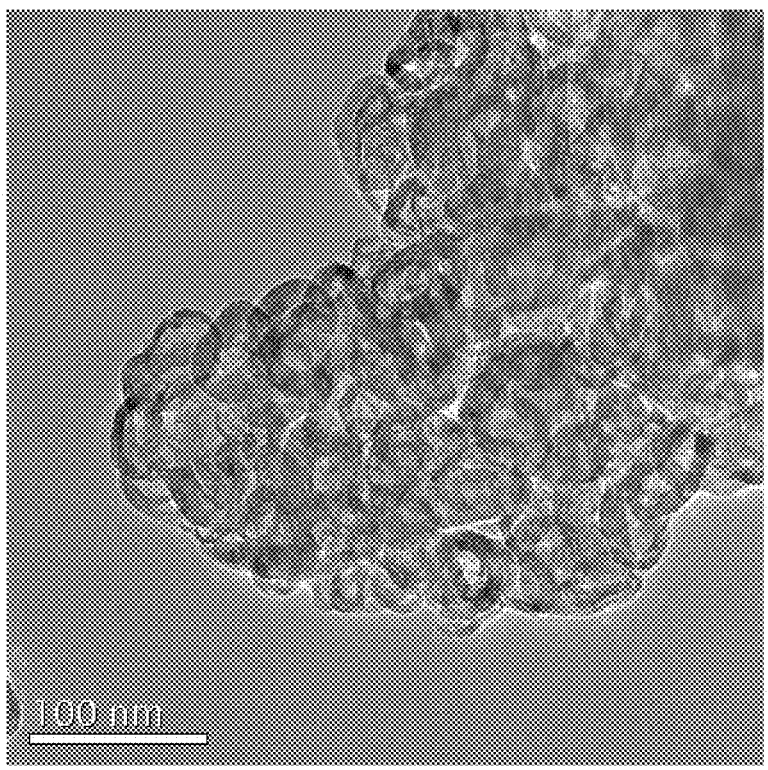
FIG. 2C is a high resolution TEM image of the carbon nanomaterial of FIG. 2A showing a plurality of carbon nanostructures agglomerated together and revealing the multi-walled and hollow nature of the carbon nanostructures that form a cluster.

FIG. 1 shows a TEM image of a carbon nanomaterial manufactured according to the present invention and having carbon nanospheres, the details of which are described in Example 1 below. FIGS. 2A and 2B show SEM images of example nanostructures made according to an alternative embodiment of the invention and FIG. 2C is a TEM image of a portion of the carbon nanomaterial in FIGS. 2A and 2B.

The TEM images interpreted in light of the SEM images show that in one embodiment the nanostructures can have a generally spheroidal shape. As seen in the figures, the nanospheres are not perfectly spherical. The irregularly shaped spheroidal structures are generally closed and have an aspect ratio of less than about 3:1 (i.e., width to height is less than 3:1), preferably less than about 2:1, more preferably less than about 1.75:1, and most preferably less than about 1.5:1.

The irregular surface includes defects in the graphite. The graphitic defects are believed to contribute in part to the ability to store hydrogen and/or to achieve a desired surface functionalization, which can also contribute to hydrogen storage.

Figure 3:
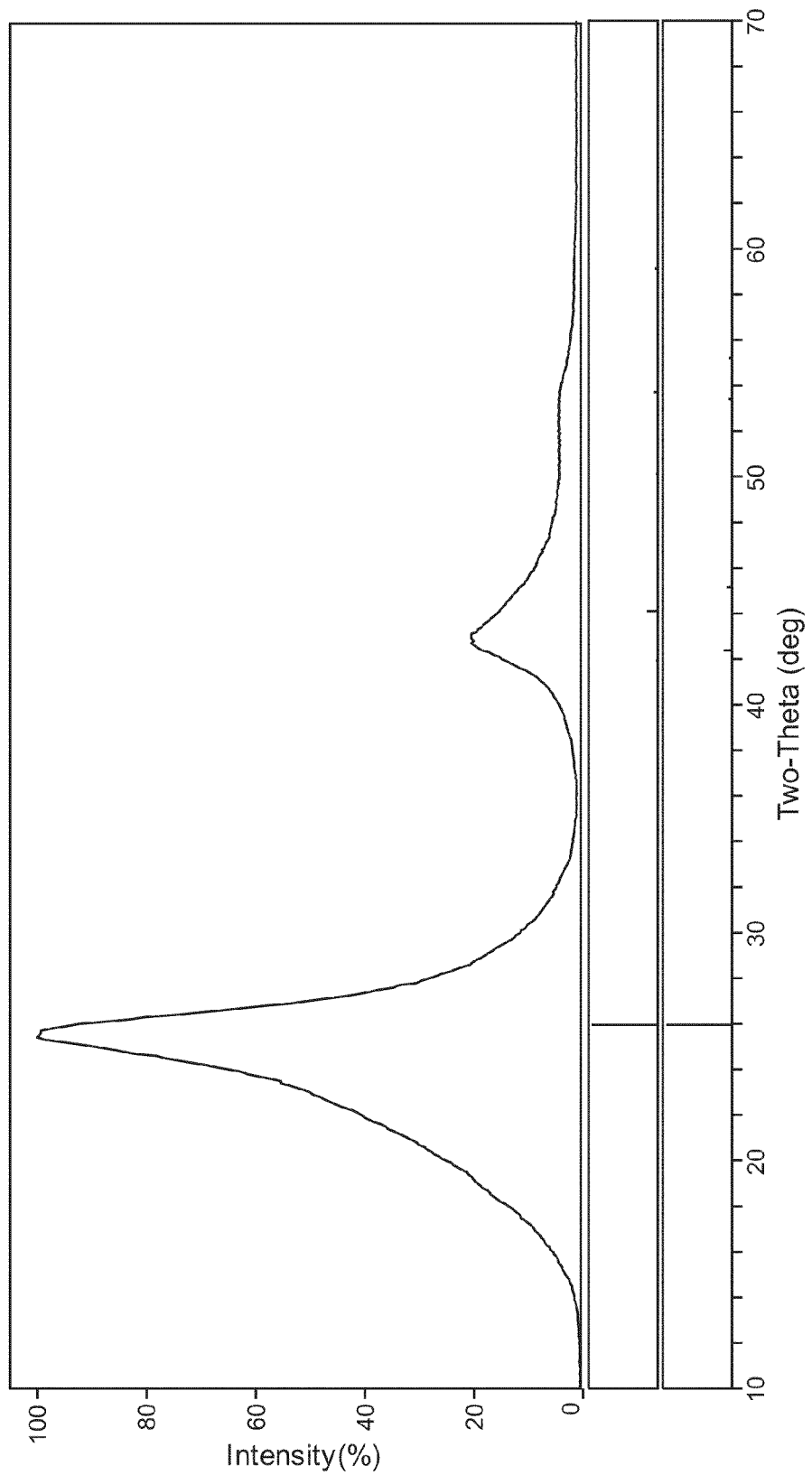
FIG. 3 shows the intensity of X-ray diffraction of the carbon nanomaterial of FIG. 1.

The carbon nanospheres are highly graphitic. Carbon nanospheres tested using X-ray diffraction yielded a diffraction pattern indicative of graphite, as shown in FIG. 3. The broad peak at about 26° suggests that the material is graphitic, since amorphous carbon tends to have a diffraction peak at 20°. The broad peak at about 26° is due to the short range order of graphitic nanostructures, which is indicative of the spheroidal nature of the nanostructures. This is in contrast to the typical diffraction pattern of graphite sheets, which have a long range order and therefore tend to have a very narrow peak. The highly graphitic nature of the carbon nanomaterials of the invention provides excellent electrical and thermal conductivity and is particularly advantageous for hydrogen storage.

In FIG. 2A-2C, the images reveal that, at least in some embodiments, the carbon nanospheres can be clustered together to form a "grape-like" secondary structure. FIG. 2B is a close-up of some of the clusters, with one cluster broken open thereby exposing a plurality of carbon nanospheres. The TEM image in FIG. 2C further shows that the clusters are made up of a plurality of smaller nanospheres.

The SEM and TEM images reveal that the nanostructures are hollow and generally spheroidal. In one embodiment, the clusters of carbon nanospheres are dispersed to facilitate hydrogen storage. Dispersion of carbon nanospheres can be carried out using an organic agent and/or sonication.

Figure 4:
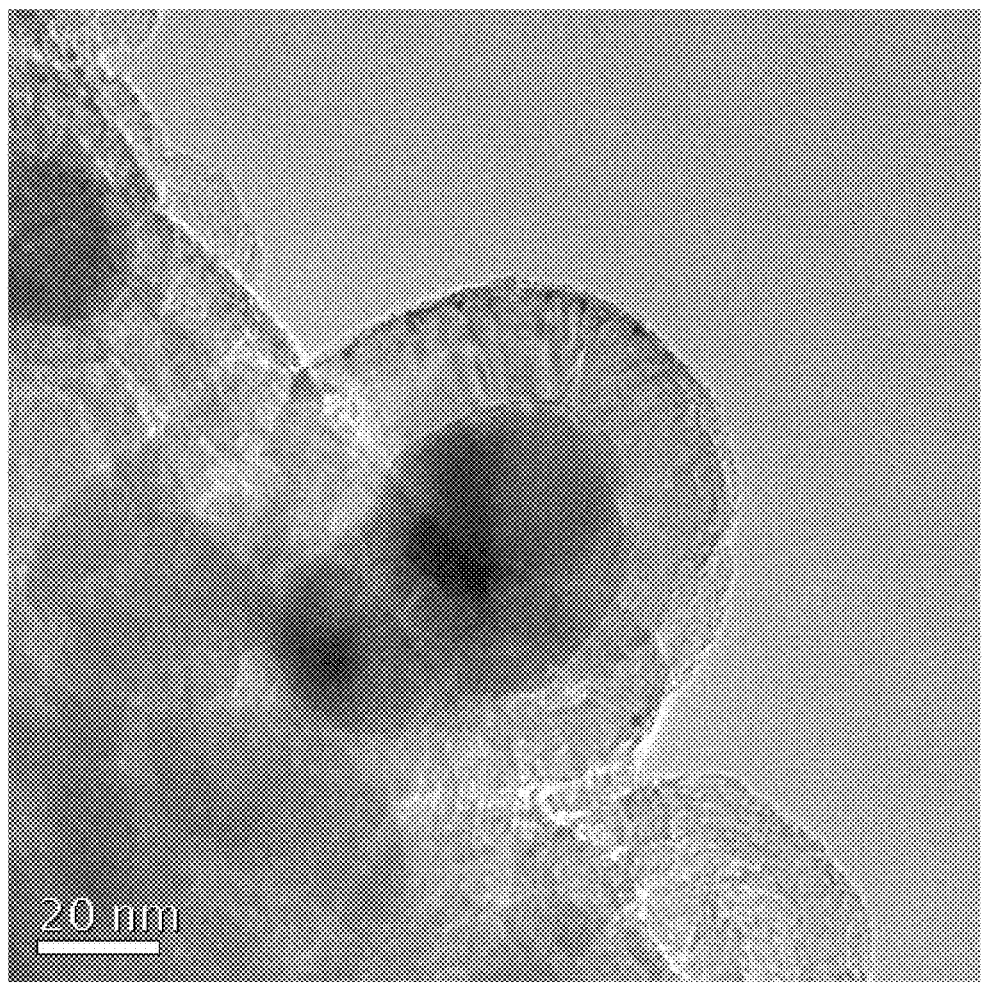
FIG. 4 is a high resolution TEM image showing a close up of a carbon nanostructure that has a catalytic templating nanoparticle in its center.

FIG. 4 is a close-up view of a carbon nanostructure that appears to have an iron templating nanoparticle remaining in the center of the carbon nanostructure. The carbon nanostructure of FIG. 4 illustrates that the formation of the carbon nanostructures occurs around the catalytic templating nanoparticles. In one embodiment, a portion of the catalytic metal is left in the carbon nanomaterial to facilitate hydrogen storage.

In many of the carbon nanostructures observed in TEM images, the outer diameter of the nanostructure is between about 10 nm and about 60 nm, and the hollow center diameter is about 10 nm to about 40 nm. However, the present invention includes nanostructures having larger and smaller diameters. Typically, the carbon nanostructures have an outer diameter that is less than about 100 nm to maintain structural integrity.

The thickness of the nanostructure wall is measured from the inside diameter of the wall to the outside diameter of the wall. The thickness of the nanostructure can be varied during manufacture by limiting the extent of polymerization and/or carbonization of the carbon precursor as described above. Typically, the thickness of the carbon nanostructure wall is between about 1 nm and 20 nm. However, thicker and thinner walls can be made if desired. The advantage of making a thicker wall is greater structural integrity. The advantage of making a thinner wall is greater surface area and nanoporosity.

The wall of the carbon nanostructure is formed from multiple graphitic layers. In one embodiment, the carbon nanostructures have walls of between about 2 and about 100 graphite layers, more preferably between about 5 and 50 graphite layers and more preferably between about 5 and 20 graphite layers. The number of graphitic layers can be varied by varying the thickness of the carbon nanostructure wall as discussed above. The multiple layers can be advantageous for storing hydrogen due to the graphitic nature of the various layers and the narrow spacing between layers.

The size and shape of the carbon nanospheres is particularly advantageous for storing hydrogen. The carbon nanospheres of the invention have a large surface area available for adsorbing hydrogen and adsorption and desorption isotherms indicate that the carbon nanospheres form a mesoporous material. The BET specific surface area of the carbon nanospheres can be between about 80 and about 400 $m^2/g$ and is preferably greater than about 120 $m^2/g$, and typically about 200 $m^2/g$, which is significantly higher than the typical 100 $m^2/g$ observed for carbon nanotubes. Even where the methods of the invention results in carbon nanostructures combined with non-structured graphite, this graphitic mixture (i.e., the carbon nanomaterial) typically has a surface area greater than carbon nanotubes. In one embodiment, the surface area is in a range from about 80 $m^2/g$ to about 400 $m^2/g$, more preferably about 120 m²/g to about 300 m²/g, and most preferably about 150 m²/g to about 250 m²/g.

The multi-walled nature of the graphitic structure provides multiple layers for storing hydrogen and provides narrow spacing between the graphite sheets for storing hydrogen. Because the nanospheres are a closed structure (as opposed to nanotubes, which are open at both ends), the carbon nanospheres do not have macro pores for hydrogen to flow through, which can improve hydrogen storage. The spheroidal shape and multi-walled nature of the carbon nanospheres also provides strength that makes the carbon nanospheres less likely to be crushed or broken into undesired shapes or non-shaped graphite. Maintaining the shape of the carbon nanospheres can be important for maintaining performance characteristics over time (e.g., adsorption and reversibility of adsorption). The multi-walled nature of the nanospheres also allows the surface to be functionalized while maintaining the beneficial thermal and electrical conductivity via the interior graphite layers.

The shape of the carbon nanospheres can also be advantageous for reducing volume compared to other graphite structures such as carbon nanotubes. Carbon nanotubes typically have a much lower packing density than carbon nanospheres. Carbon nanospheres, which pack similar to a particulate, pack significantly more tightly than carbon nanotubes, which pack similar to a disordered fiber. The increased packing density of carbon nanospheres reduces the overall bulk volume needed to store a given amount of carbon nanospheres within a vessel, thereby reducing the overall size and weight of the vessel used to house the carbon nanospheres for a given amount of hydrogen storage.

The size and shape of the nanostructure is determined in large part by the size and shape of the templating nanoparticles used to manufacture the carbon nanostructures. Because the carbon nanostructures form around the templating nanoparticles, the hole or inner diameter of the carbon nanostructures typically correspond to the outer diameter of the templating nanoparticles. The inner diameter of the carbon nanostructures can be between 0.5 nm to about 90 nm, more preferably between about 1 nm and about 50 nm.

The carbon nanomaterials of the invention can be characterized by their weight percent of carbon nanostructures. The weight percent of carbon nanostructures (e.g., nanospheres) in the carbon nanomaterial can be greater than 10%, preferably greater than 50%, more preferably greater than 75%, even more preferably greater than 90%, and most preferably greater than 98% by weight.

To use the carbon nanospheres for hydrogen storage, the carbon nanospheres can be placed in any vessel capable of housing the carbon nanomaterial and exposing the carbon nanomaterial to hydrogen such that it can be adsorbed. In one embodiment, the vessel is pressurized. Examples of suitable ranges of pressure that can be used include from about 100 atm to about 0.1 atm, more preferably from about 50 atm to about 1 atm.

V. Examples

The following examples provide formulas for making carbon nanomaterials and storing hydrogen using the nanomaterials.

EXAMPLE 1

Example 1 describes the preparation of a carbon nanomaterial having carbon nanospheres.

(a) Preparation of Iron Solution (0.1 M)

A 0.1 M iron solution was prepared by using 84 g iron powder, 289 g of citric acid, and 15 L of water. The iron-containing mixture was mixed in a closed bottle on a shaker table for 3 days, with brief interruptions once or twice daily to purge the vapor space of the bottle with air gas before resuming mixing.

(b) Preparation of Precursor Mixture 916.6 g of resorcinol and 1350 g of formaldehyde (37% in water) were placed into a round bottom flask. The solution was stirred until resorcinol was fully dissolved. 15 L of the iron solution from step (a) was slowly added with stirring, and then 1025 ml of ammonium hydroxide (28-30% in water) was added drop-wise with vigorous stirring, the pH of the resulted suspension was 10.26. The slurry was cured at 80~90° C. (water bath) for 10 hours. The solid carbon precursor mixture was then collected using filtration and dried in an oven overnight.

(c) Carbonization

The polymerized precursor mixture was placed in a crucible with a cover and transferred to a furnace. The carbonization process was carried out under ample nitrogen flow using the following temperature program: room temperature→1160° C. at a rate of 20° C./min→hold for 5 hrs at 1160° C.→room temperature. The carbonization step yielded an intermediate carbon material having carbon nanostructures, amorphous carbon, and iron.

(d) Purification To Remove Amorphous Carbon and Iron

The purification of the carbonized carbon product (i.e., the intermediate carbon material) was performed as follows: reflux carbonized product in 5M $HNO_3$ for ~12 hrs→rinse with de-ionized (DI)-$H_2O$→treat with a mixture of $KMnO_4$+$H_2SO_4$+$H_2O$ at a mole ratio of 1:0.01:0.003 (keep at ~90° C. for ~12 hrs)→rinse with DI-$H_2O$→treat with 4M HCl (keep at ~90° C. for ~12 hrs)→rinse with Di-$H_2O$→collect the product and dry in the oven at ~100° C. for two days

EXAMPLE 2

Figure 5A:
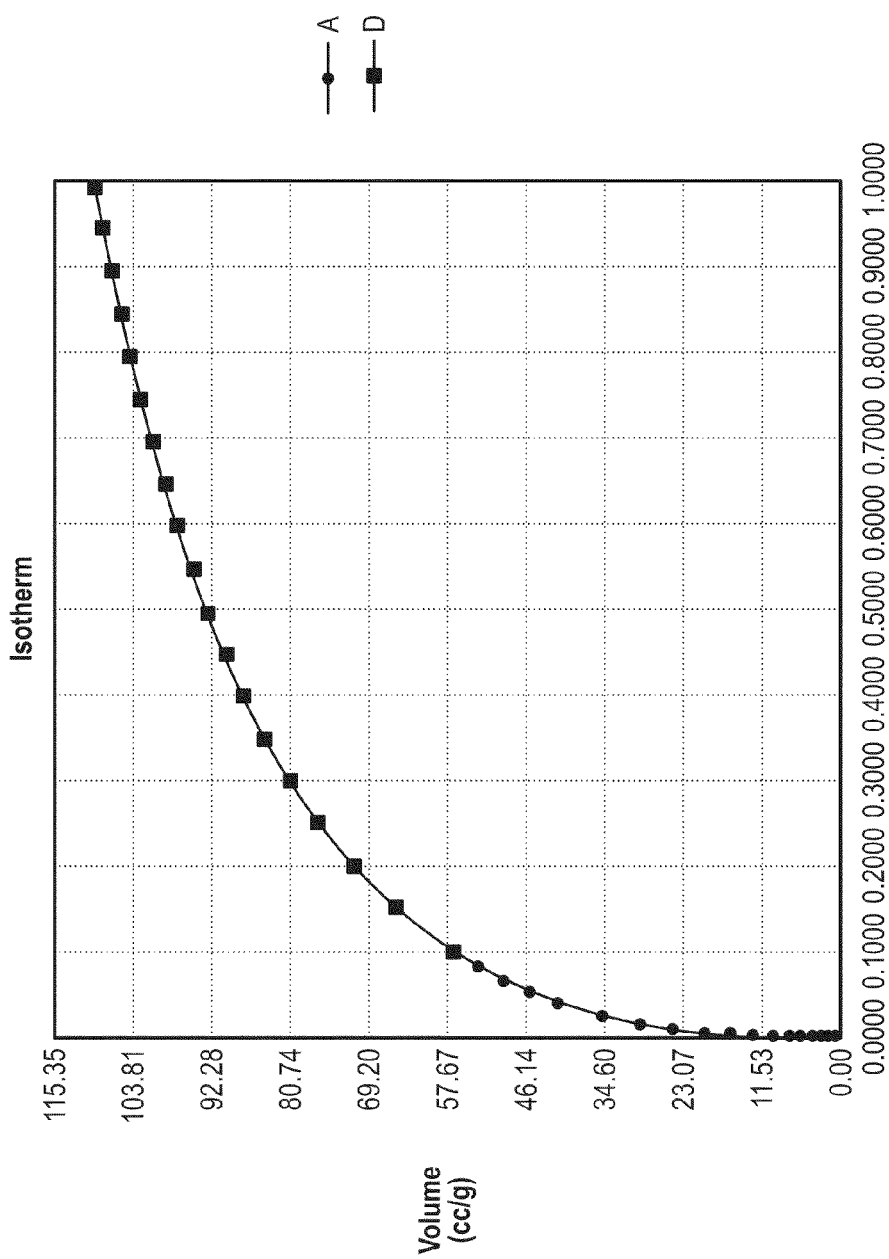
FIG. 5A is an adsorption/desorption isotherm of hydrogen on the carbon nanomaterial of FIG. 1.
Figure 5B:
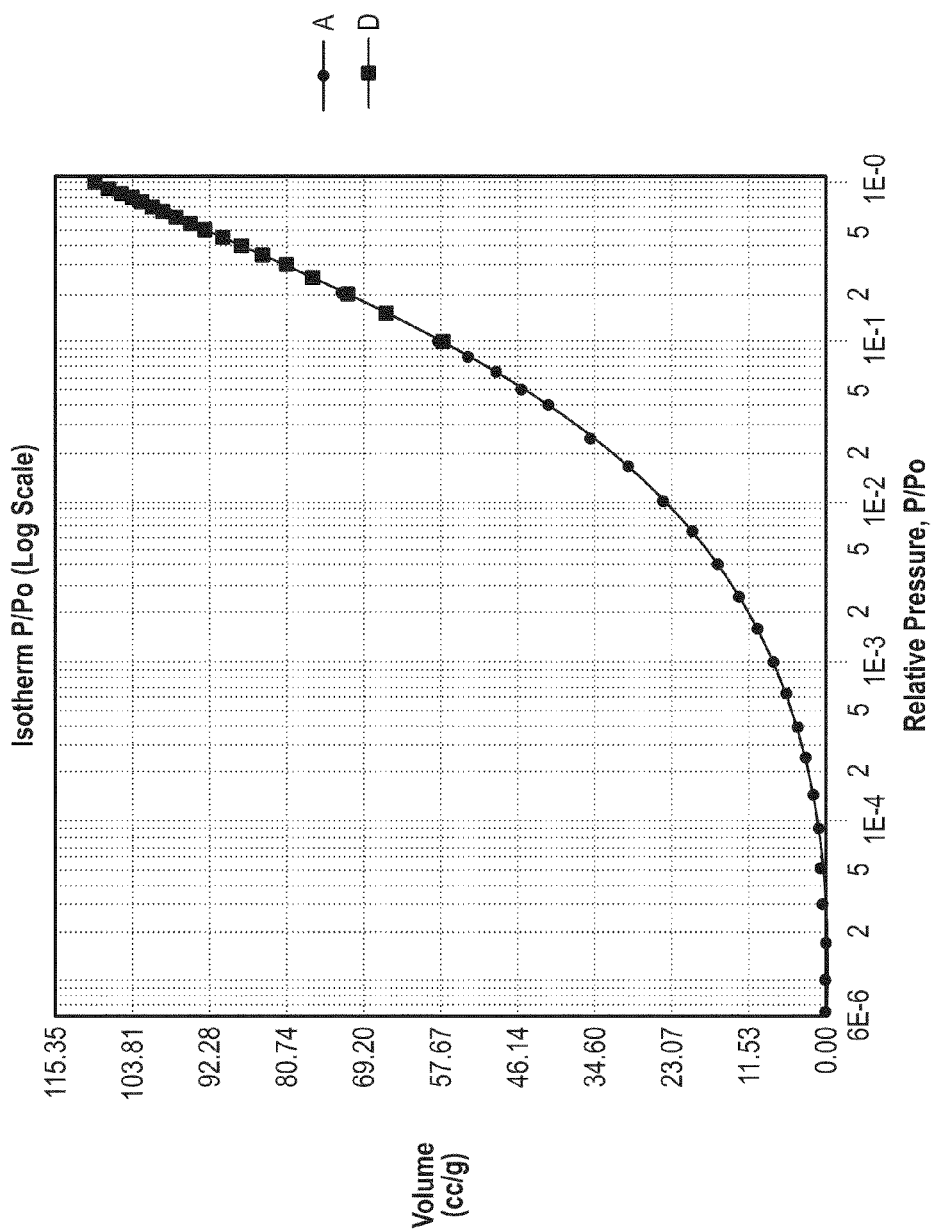
FIG. 5B is a logarithmic scale of the adsorption/desorption isotherm of FIG. 5A.

Example 2 describes the use of the carbon nanospheres of Example 1 to store hydrogen. Hydrogen storage was evaluated using an Autosorb-1C with a mass spectrometer. A sample of carbon nanomaterial (0.0749 g) manufactured using the method of Example 1 was prepared by outgassing the sample for 3 hours under inert gas and vacuum and heating to a temperature of 1100° C. The prepared sample was then cooled to 77K using liquid nitrogen and dosed with hydrogen. The hydrogen was then outgassed at 300° C. over 8 hours. The adsorption/desorption isotherm is shown in FIG. 5A and a logarithmic scale shown in FIG. 5B. The outgassing indicated that 1.0 wt % hydrogen was adsorbed. The hydrogen adsorption was carried out at 77K and atmospheric pressure.

Surprisingly the carbon nanomaterials of the invention yielded a storage capacity of 1.0 wt %. This storage capacity was unexpected for the specific sample tested since it was not optimized for storage. The 1.0 wt % storage capacity is similar to the storage capacity of many carbon nanotubes that have been optimized for hydrogen storage. Given the relatively good hydrogen storage and advantageous physical properties, the carbon nanospheres of the invention provide improvements in hydrogen storage compared to other existing carbon nanomaterials such as carbon nanotubes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A hydrogen storage apparatus, comprising:
   a vessel comprising a chamber and having an inlet for receiving hydrogen; and
   a carbon nanomaterial disposed in the chamber of the vessel so as to be exposed to hydrogen introduced into the chamber through the inlet, the carbon nanomaterial comprising at least 10 wt % multi-walled carbon nanospheres, the carbon nanospheres having an average outer diameter in a range from about 10 nm to about 200 nm, an aspect ratio of less than 3:1, and an irregularly-shaped surface with graphitic defects for increased hydrogen storage capacity.

2. A hydrogen storage apparatus as in claim 1, wherein the carbon nanomaterial is manufactured by,
   forming a precursor mixture comprising a carbon precursor and a plurality of templating nanoparticles, the templating nanoparticles comprising a catalytic metal;
   carbonizing the precursor mixture to form an intermediate carbon material comprising a plurality of carbon nanostructures, amorphous carbon, and optionally remaining catalytic metal; and
   purifying the intermediate carbon material by removing at least a portion of the amorphous carbon and optionally a portion of any remaining catalytic metal.

3. A hydrogen storage apparatus as in claim 2, in which the templating nanoparticles are prepared by,
   (a) reacting a plurality of precursor catalyst atoms with a plurality of organic dispersing agent molecules to form complexed catalyst atoms; and
   (b) allowing or causing the complexed catalyst atoms to form the templating nanoparticles.

4. A hydrogen storage apparatus as in claim 1, in which the plurality of carbon nanospheres comprises at least about 50 wt % of the carbon nanomaterial.

5. A hydrogen storage apparatus as in claim 1, in which the plurality of carbon nanospheres comprises at least about 90 wt % carbon nanospheres.

6. A hydrogen storage apparatus as in claim 1, in which the carbon nanospheres have a BET surface area in a range from about 80 $g/m^2$ to about 400 $g/m^2$.

7. A hydrogen storage apparatus as in claim 1, in which the carbon nanospheres have a BET surface area in a range from about 120 $g/m^2$ to about 300 $g/m^2$.

8. A hydrogen storage apparatus as in claim 1, in which the carbon nanospheres have an aspect ratio of less than about 2:1.

9. A hydrogen storage apparatus as in claim 1, in which the carbon nanospheres have an aspect ratio of less than about 1.5:1.

10. A hydrogen storage apparatus as in claim 1, in which the carbon nanomaterial comprises a transition metal in a concentration of about 12% to about 0.01%.

11. A hydrogen storage apparatus as in claim 1, in which the carbon nanospheres have an inner diameter in a range of about 0.5 nm to about 90 nm.

12. A hydrogen storage apparatus as in claim 1, in which the carbon nanospheres have an inner diameter in a range of about 1 nm and about 50 nm.

13. A hydrogen storage apparatus as in claim 1, further comprising hydrogen adsorbed onto the carbon nanomaterial in a concentration of at least about 1 wt % of the carbon nanomaterial.

14. A hydrogen storage apparatus as in claim 13, wherein the hydrogen is under a pressure in a range from 100 atm to about 0.1 atm.

15. A hydrogen storage apparatus as in claim 13, wherein the hydrogen is under a pressure in a range from 50 atm to about 1 atm.

16. A hydrogen storage apparatus, comprising:
   a vessel comprising a chamber and having an inlet for receiving hydrogen;
   a carbon nanomaterial disposed in the chamber of the vessel so as to be exposed to hydrogen introduced into the chamber through the inlet, the carbon nanomaterial comprising at least 10 wt % multi-walled carbon nanospheres, the carbon nanospheres having an average outer diameter in a range from about 10 nm to about 200 nm, an aspect ratio of less than 3:1, a BET surface area of at least about 120 $g/m^2$, and an irregularly-shaped surface with graphitic defects for increased hydrogen storage capacity; and
   hydrogen adsorbed onto the carbon nanomaterial in a concentration of at least about 1 wt % of the carbon nanomaterial.

17. A hydrogen storage apparatus as in claim 16, wherein the hydrogen is under a pressure in a range from 50 atm to about 1 atm.

18. A hydrogen storage apparatus as in claim 16, wherein the carbon nanomaterial is manufactured by,
   forming a precursor mixture comprising a carbon precursor and a plurality of templating nanoparticles, the templating nanoparticles comprising a catalytic metal;
   allowing or causing the carbon precursor to polymerize around the templating nanoparticles;
   carbonizing the precursor mixture to form an intermediate carbon material comprising a plurality of carbon nanostructures, amorphous carbon, and optionally remaining catalytic metal; and
   purifying the intermediate carbon material by removing at least a portion of the amorphous carbon and optionally a portion of any remaining catalytic metal.

19. A hydrogen storage apparatus as in claim 18, in which the templating nanoparticles are prepared by,
   (a) reacting a plurality of precursor catalyst atoms with a plurality of organic dispersing agent molecules to form complexed catalyst atoms; and
   (b) allowing or causing the complexed catalyst atoms to form the templating nanoparticles.

20. A method for manufacturing a hydrogen storage apparatus, comprising:
   providing a carbon nanomaterial, the carbon nanomaterial comprising at least 10 wt % multi-walled carbon nanospheres, the carbon nanospheres having an average outer diameter in a range from about 10 nm to about 200 nm, an aspect ratio of less than 3:1, and an irregularly-shaped surface with graphitic defects for increased hydrogen storage capacity; and
   introducing the carbon nanomaterial into a vessel comprising a chamber and having an inlet for receiving hydrogen.

21. A method as in claim 20, further comprising introducing hydrogen into the chamber of the vessel through the inlet and allowing the carbon nanomaterial to adsorb at least 1 wt % hydrogen.

22. A method as on claim 20, in which the carbon nanospheres have a BET surface area in a range from about 80 $g/m^2$ to about 400 $g/m^2$.

23. A method as in claim 20, wherein the carbon nanomaterial is manufactured by,
   forming a precursor mixture comprising a carbon precursor and a plurality of templating nanoparticles, the templating nanoparticles comprising a catalytic metal;

allowing or causing the carbon precursor to polymerize around the templating nanoparticles;

carbonizing the precursor mixture to form an intermediate carbon material comprising a plurality of carbon nanostructures, amorphous carbon, and optionally remaining catalytic metal; and purifying the intermediate carbon material by removing at least a portion of the amorphous carbon and optionally a portion of any remaining catalytic metal.

24. A method as in claim 23, in which the templating nanoparticles are prepared by,
(a) reacting a plurality of precursor catalyst atoms with a plurality of organic dispersing agent molecules to form complexed catalyst atoms; and
(b) allowing or causing the complexed catalyst atoms to form the templating nanoparticles.

* * * * *

UNITED STATES PATENT AND TRADEMARK OFFICE
CERTIFICATE OF CORRECTION

PATENT NO. : 8,062,624 B2
APPLICATION NO. : 12/604181
DATED : November 22, 2011
INVENTOR(S) : Zhou et al.

It is certified that error appears in the above-identified patent and that said Letters Patent is hereby corrected as shown below:

Column 3
Line 33, change "types carbon" to --types of carbon--

Column 4
Line 39, change "irregularly shaped multi-walled" to --irregularly shaped, multi-walled--

Column 7
Line 25, change "easy" to --easily--

Column 12
Line 4, change "FIG. 2A-2C" to --FIGS. 2A-2C--

Column 14
Line 33, change "days" to --days.--

Column 16
Line 60, change "as on claim" to --as in claim--

Signed and Sealed this
Twenty-seventh Day of March, 2012

David J. Kappos
*Director of the United States Patent and Trademark Office*